United States Patent Office 3,506,750
Patented Apr. 14, 1970

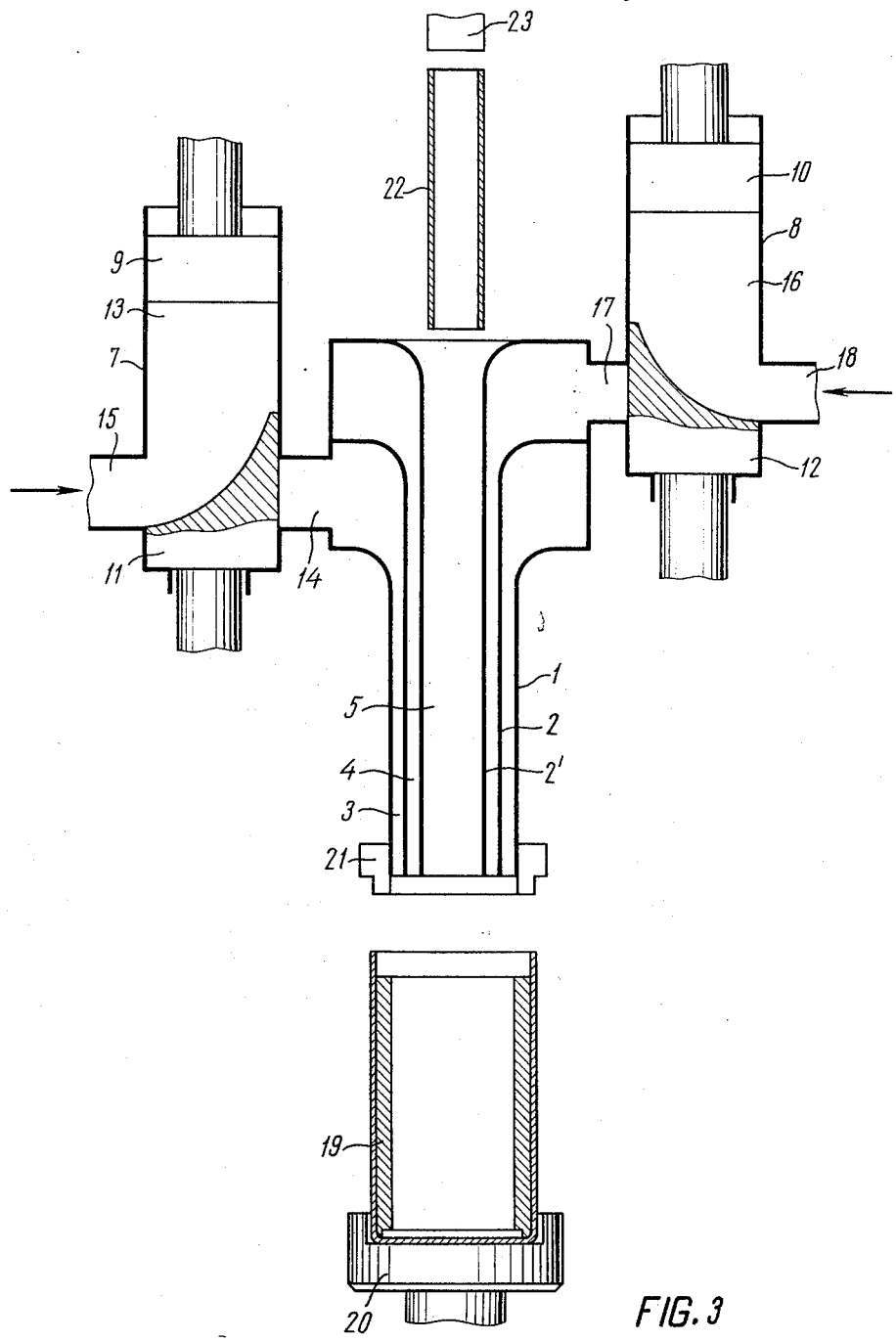

3,506,750
METHOD FOR MANUFACTURE OF GALVANIC CELLS
Faat Khatovich Nabiullin, 3 Mytischinskaya ulitsa 14-a, kv. 90; Zoja Mikhailovna Buzova, Suschevsky val. 23, kv. 116; and Efim Mikhailovich Gertsik, 3 Mytischinskaya ulitsa 14-a, kv. 98, all of Moscow, U.S.S.R.; Boris Vasilyevich Marfin, Balashikha 1, ulitsa Sovetskaya 16, kv. 6, Moskovskaya, Obl., U.S.S.R.; and Vyacheslav Anatolievich Rabinovich, Razumovskaya naberezhnaya 14, kv. 34; and Ivan Ivanovitch Koval, N-Peschanaya ulitsa 23/7, kv. 369, both of Moscow, U.S.S.R.
Filed May 31, 1967, Ser. No. 642,415
Claims priority, application U.S.S.R., May 31, 1966, 1,080,913; Oct. 29, 1966, 1,109,586, 1,110,215; Mar. 1, 1967, 1,133,410
Int. Cl. C04b 35/00; H01m 31/00, 33/00
U.S. Cl. 264—104                4 Claims

---

ABSTRACT OF THE DISCLOSURE

A method for the manufacture of galvanic cells with coaxially disposed electrodes and an ion-conducting diaphragm in which the electrolyte is preliminarily gelled and is then pressed into the casing of a galvanic cell simultaneously with at least one electrode of the cell.

---

This invention relates to methods and for the manufacture of galvanic cells, particularly alkaline cells, as well as for the manufacture of salt cells and pocketless secondary batteries and apparatus therefor.

It is known to manufacture galvanic cells containing a salt electrolyte by a method which comprises filling the pocket of a negative electrode, e.g. a zinc anode, with a suspension containing electrolyte and starch, followed by inserting the material of a positive electrode. Incorporation of the positive electrode into the pocket causes the suspension to be displaced and to fill the interelectrode space. Suspension thickening to yield an ion-conducting diaphragm is either a time-controlled process, when use is made of self-thickening suspensions, or calls for the application of heat.

The employment of the aforementioned method for the manufacture of galvanic cells, e.g. cylindrical alkaline cells with the negative electrode made of pasted zinc, does not provide galvanic cells having standard operating characteristics. This disadvantage of the prior art method is due to two major factors.

First of all, starch swelling in an alkaline medium proceeds at a high rate, so that cell assembling technology necessitates cooling the alkali to a temperature of 0 to 5° C. in the course of preparing the material from which the ion-conducting diaphragm is made. However, the use of cooled alkali makes it possible to store the prepared starch suspension in the liquid form for a period of not more than 15 minutes. Longer storage results in suspension thickening. The starch suspension thickens in the cell for 2 min., during which period in the pasted negative electrode immersed in the suspension there occurs deterioration of the electrode external layer and the downward flow of electrode material particles, the latter phenomenon being responsible for eventual shorting and self-discharge in the course of cell storage.

Secondly, the process of pouring the suspension into the cell causes the suspension to mix with positive electrode material particles in the bottom part of the electrode, so that self-discharge of the cell may occur during storage.

It is also known to manufacture alkaline galvanic cells by a method which comprises placing the negative electrode material, e.g. pasted zinc, in a starch suspension which consists of starch and water; drying the electrode in air for a period of time (15–20 sec.) required for a swollen starch film to be formed on the surface of the negative electrode, followed by pouring the alkali into the pocket of the positive electrode and inserting the negative electrode into the pocket. Here ion-conducting diaphragm formation proceeds within 3–4 sec. (cf. the U.S.S.R. Certificate of Authorship, No. 133,082).

Although the latter method makes it possible to somewhat improve the quality of galvanic cells, it is nevertheless not free from a number of disadvantages.

The major disadvantage of the latter method stems from the fact that it does not eliminate the possibility of shorting within the cell, since liquid alkali incorporation into the cell results in suspending the particles of the positive electrode material.

Another disadvantage of the method in question consists in that the material, from which the thickened electrolyte (ion-conducting diaphragm) is made, is of variable composition because drying of the negative electrode material is accompanied by flow of the suspension to the edges of the electrode so that the starch film is non-uniform with respect to the electrode height. Other factors responsible for variations in the thickened electrode composition are that the amount of starch taken up by the electrodes immersed in the suspension is not constant and the concentration of starch in the suspension diminishes continuously.

Although the employment of known apparatus for the manufacture of galvanic cells renders it possible to mechanize selected operations involved in the prior art methods, said apparatus are not conducive, to a reduction in the number of production operations involved.

It is an object of the present invention to eliminate the aforementioned disadvantages which are inherent in the known methods for the manufacture of galvanic cells and to provide a highly efficient and reliable apparatus that will make it possible to improve the quality of galvanic cells and also to decrease the number of production operations.

These and other objects may be accomplished, according to the invention, by subjecting the electrolyte to preliminary gelling, followed by simultaneous pressing in and molding of the gelled electrolyte and the material comprising at least one electrode into the casing of a galvanic cell.

It is expedient to preliminarily place the positive electrode in the galvanic cell casing and thereafter to press in simultaneously the negative electrode material and the gelled electrolyte.

It is likewise feasible to simultaneously press in the gelled electrolyte and the material of both electrodes into the casing of a galvanic cell. It is sound practice to incorporate a current conductor into the negative electrode simultaneously with pressing in the gelled electrolyte and the material of the negative electrode.

The apparatus for accomplishing the present method comprises, according to the invention, a material molding nozzle which consists of at least two concentrically disposed tubular cores. It is expedient to connect one nozzle cavity with a gelled electrolyte feeder, and the other cavity with a negative electrode material feeder, each feeder communicating with an appropriate material feed conduit.

It is good practice to make each of said feeders in the form of a cylinder furnished with a movable piston and a valve, the valve being intended to alternately connect, in the course of operation, the cylinder with the feed conduit and the cavities of said nozzle.

The present method has an advantage over prior art methods in that the ion-conducting diaphragm is manufactured from a pre-gelled electrolyte which withstands prolonged storage without deterioration and, hence, exerts no adverse effect on the characteristics of galvanic cells. Another advantage of the present method is that it results in complete elimination of internal shorting between the cell electrodes.

The present method is likewise conductive to decreasing substantially the number of operations since the material from which the ion-conducting diaphragm and electrodes are made are delivered simultaneously into the cell casing.

The process of galvanic cell manufacture lends itself to mechanization as a result of the employment of the present apparatus comprised of a nozzle wherein the cavities are connected to cylinders furnished with movable pistons and valves.

The invention is illustrated hereinbelow by exemplary embodiments thereof, the description, and accompanying drawings, wherein:

FIG. 3 is a schematic diagram of the feeder, according to the invention, for feeding the materials into the nozzle cavities.

The essence of the present method will become apparent from the description of design modifications and operation of the arrangements for embodying the method.

The apparatus for alkaline galvanic cell manufacture comprises a nozzle (FIG. 1) which comprises an external shell 1 and two coaxially disposed tubular cores 2 and 2' which form cavities 3 and 4. The shape and dimensions of shell 1 should correspond to those of the positive electrode (not shown) in the casing of the galvanic cell being manufactured.

Cavities 3 and 4 are charged with the pre-gelled electrolyte and negative electrode material, respectively, while cavity 5 accommodates the current conductor of the negative electrode.

Under the effect of appropriate pressure, the materials contained in cavities 3 and 4 are simultaneously pressed in the cavity formed by the positive electrode, so that the ion-conducting diaphragm and negative electrode will be molded in the cell casing. The current conductor is simultaneously fed through cavity 5 so that eventually it forms an intimate contact with the negative electrode.

Figure 2:
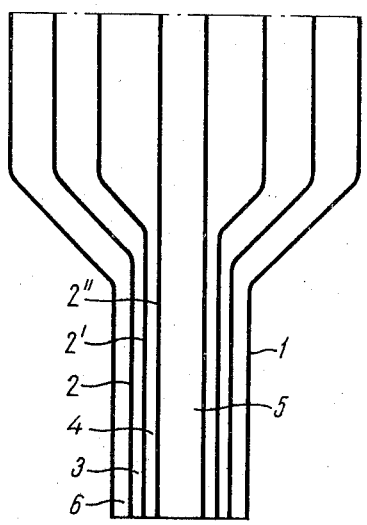
FIG. 2 shows a longitudinal sectional view of the nozzle, according to the invention, intended for pressing in the negative and positive electrode materials, gelled electrolyte, and current conductor into the casing of a galvanic cell.

The apparatus shown in FIG. 2 comprises a nozzle which can be advantageously used for effecting the simultaneous pressing in and molding of the negative and positive electrodes and the ion-conducting diaphragm (not shown). The nozzle comprises outer shell 1 and three coaxially disposed cores 2, 2', and 2" which form cavities 3, 4, and 6 filled with the gelled electrolyte, negative electrode material, and positive electrode material, respectively. Cavity 5 is intended for feeding the current conductor of the negative electrode, said current conductor being incorporated into the galvanic cell casing simultaneously with the materials contained in cavities 3, 4, and 6. The shape and dimensions of external shell 1 should correspond to those of the galvanic cell casing (not shown).

Figure 1:
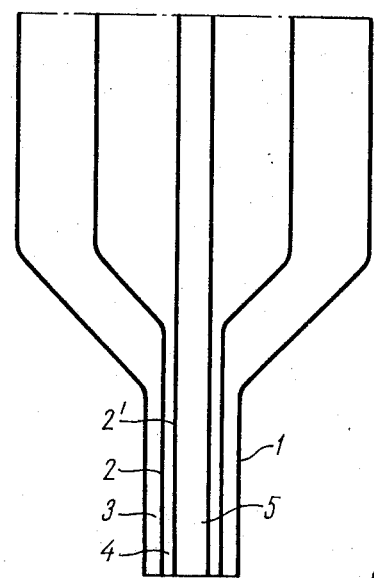
FIG. 1 shows a longitudinal sectional view of the nozzle, according to the invention, intended for pressing in the negative electrode material, gelled electrolyte, and current conductor into a galvanic cell casing with the positive electrode being previously disposed therein.

To manufacture galvanic cells, i.e. to press in and mold the electrodes and ion-conducting diaphragm, recourse is had to the procedure disclosed with reference to the apparatus shown in FIG. 1.

The apparatus presented in FIG. 3 makes it possible to mechanize the process of galvanic cell manufacture by controlling the flow of materials.

This apparatus is comprised of a nozzle with external shell 1 and cores 2 and 2' which form cavities 3, 4, and 5, and cylinders 7 and 8 with movable pistons 9 and 10 and control valves 11 and 12, said cylinders with said pistons and said valves serving as feeders for the delivery of the gelled electrolyte and electrode materials.

Chamber 13 of cylinder 7 communicates with cavity 3 of the nozzle via channel 14 and delivery line 15.

Chamber 16 of cylinder 8 communicates with cavity 4 of the nozzle via channel 17 and delivery line 18.

The apparatus operates as follows.

A galvanic cell with positive electrode 19 pressed into it is mounted on the nozzle by pusher 20, during which operation guide ring 21, which also serves for protecting positive electrode 19 from destruction, displaces along external shell 1.

Chambers 13 and 16 of cylinders 7 and 8 communicating via valves 11 and 12 with respective conduits 15 and 18, the ion-conducting diaphragm and negative electrode materials are delivered into said chambers. This causes pistons 9 and 10 to be raised, thereby freeing a certain volume.

When cylinders 7 and 8 are fully charged, valves 11 and 12 rotate (in figures the angle of valve rotation equals 180 deg.) so that chambers 13 and 16 of cylinders 7 and 8 communicate via channels 14 and 17 with respective cavities 3 and 4 of the nozzle. Current conductor 22, upon entry into cavity 5, is pressed by rod 23 to the bottom of the cell casing. The downward stroke of pistons 9 and 10 forces the materials contained in chambers 13 and 16 of cylinders 7 and 8 into cavities 3 and 4 of the nozzle, whereupon the materials are pressed into the cell casing which contains the positive electrode 19, and form the ion-conducting diaphragm and negative electrode.

Pusher 20 is displaced synchronously with the delivery of the materials and current conductor 23 into the cell casing.

The apparatus for simultaneously pressing in materials of the positive and negative electrodes and of the ion-conducting diaphragm may be designed in the same way as is the apparatus described hereinabove, except that the nozzle should contain three coaxially disposed cores and the thus formed cavities communicate with three cylinders.

The present invention makes it possible to substantially simplify the technology of galvanic cell manufacture, to improve the quality of cells and ensure stable operating characteristics, to eliminate the phenomenon of self-discharge during cell storage due to interelectrode leakage, and also to provide highly efficient automatic apparatus which diminish the labor involved in the manufacture of galvanic cells.

We claim:

1. A method for the manufacture of galvanic cells containing coaxially disposed positive and negative electrodes with current conductors and an ion-conducting diaphragm separating said electrodes, said method comprising subjecting an electrolyte to preliminary gelling, followed by simultaneously pressing in and molding the pre-gelled electrolyte and the material comprising at least one electrode into the casing of a galvanic cell.

2. A method according to claim 1, wherein a positive electrode is preliminarily disposed in the galvanic cell casing into which are simultaneously pressed the material comprising the negative electrode and the pre-gelled electrolyte.

3. A method according to claim 1, wherein the pre-gelled electrolyte and materials comprising both electrodes are simultaneously pressed into the galvanic cell casing.

4. A method according to claim 2, wherein the pressing in of the pre-gelled electrolyte and the material comprising the negative electrode is carried out simultaneously with the incorporation of a current conductor into the negative electrode.

References Cited

UNITED STATES PATENTS

| 1,495,990 | 6/1924 | Olaneta | 136—175.2 |
| 1,737,188 | 11/1929 | Currie | 136—175.2 |

FOREIGN PATENTS

| 562,280 | 6/1944 | Great Britain. |

WINSTON A. DOUGLAS, Primary Examiner

D. L. WALTON, Assistant Examiner

U.S. Cl. X.R.

136—175